US012681364B2

(12) United States Patent (10) Patent No.: US 12,681,364 B2
Beyene et al. (45) Date of Patent: Jul. 14, 2026

(54) PRIVACY LIGHT-EMITTING DIODE AND CONTROL CIRCUIT THEREOF

(71) Applicant: Microsoft Technology Licensing, LLC, Redmond, WA (US)

(72) Inventors: Yonatan Moges Beyene, Bellevue, WA (US); Manish K Shah, Redmond, WA (US); Ying Huang, Sammamish, WA (US); Lester Hing Kwok Lao, Mercer Island, WA (US); Donghwi Kim, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 18/613,026

(22) Filed: Mar. 21, 2024

(65) Prior Publication Data

US 2025/0298290 A1 Sep. 25, 2025

(51) Int. Cl.
| | |
|---|---|
| *G03B 17/18* | (2021.01) |
| *H04N 23/11* | (2023.01) |
| *H04N 23/13* | (2023.01) |
| *H04N 23/667* | (2023.01) |

(52) U.S. Cl.
CPC ............. *G03B 17/18* (2013.01); *H04N 23/11* (2023.01); *H04N 23/13* (2023.01); *H04N 23/667* (2023.01)

(58) Field of Classification Search
CPC ........ G03B 17/18; H04N 23/11; H04N 23/13; H04N 23/667
See application file for complete search history.

(56) References Cited

U.S. PATENT DOCUMENTS

| | | | |
|---|---|---|---|
| 8,179,419 | B2 | 5/2012 | Girish |
| 2014/0123208 | A1* | 5/2014 | Plagemann ........... H04L 63/101 726/1 |
| 2016/0226917 | A1 | 8/2016 | Plagemann |
| 2019/0221958 | A1* | 7/2019 | Karc ........................ H02G 3/08 |
| 2022/0321771 | A1* | 10/2022 | Nayshtut .............. H04N 23/667 |
| 2024/0048859 | A1* | 2/2024 | Chen .................... H04N 25/707 |

FOREIGN PATENT DOCUMENTS

| | | |
|---|---|---|
| CN | 207150909 U | 3/2018 |
| CN | 113593199 A | 11/2021 |

OTHER PUBLICATIONS

"Pixelink Knowledge Base", retrieved from: https://support.pixelink. com/support/solutions/articles/3000034824-led-light-status, Feb. 6, 2023, 1 page.

(Continued)

*Primary Examiner* — Gevell V Selby
(74) *Attorney, Agent, or Firm* — Alleman Hall LLP

(57) ABSTRACT

A computing device is provided, including a camera and a privacy light-emitting diode (LED) configured to be illuminated in conjunction with powering of the camera. The computing device further includes an LED control circuit configured to power the camera and the privacy LED via a shared power rail such that the privacy LED is illuminated. The LED control circuit controls power provided to the privacy LED via the shared power rail using a hardware-level signal. The hardware-level signal is generated based at least in part on a camera power signal provided to the camera and a platform reset signal of the computing device.

20 Claims, 13 Drawing Sheets

(56) References Cited

OTHER PUBLICATIONS

Golden, et al., "Camera privacy shutters and kill switches", retrieved from: https://learn.microsoft.com/en-us/windows-hardware/drivers/stream/camera-privacy-controls#electromechanical-camera-privacy-shutter, Jan. 2, 2024, pp. 1-16.

"LED Lighting Control Reference Design for Machine Vision", Retrieved From: https://www.ti.com/lit/ug/tidudb6/tidudb6.pdf?ts=1701062590017&ref_url=https%253A%252F%252Fwww.google.com%252F, Dec. 2017, 65 Pages.

Rankin, Kyle, "Apple Has No Tolerance for Webcam Covers", Retrieved From: https://puri.sm/posts/apple-has-no-tolerance-for-webcam-covers/, Jul. 21, 2020, 13 Pages.

* cited by examiner

CAMERA POWER SIGNAL 32 (E.G., +1P8V_CAM_RGB)

SELF-SECURED SYSTEM SIGNAL 31 (E.G., +1P8V_SoC)

On 1st rising edge of +1P8V_CAM_RGB, add 11.5 sec delay. After that, output follows +1P8V_CAM_RGB.

When +1P8V_SoC goes off, reset and wait again for 1st rising edge of +1P8V_CAM_RGB.

TOTAL PRIVACY LED POWER 60

PRIVACY LED 14

BOOT SEQUENCE 40

74

High

Low

TOTAL CAMERA POWER 72

~10 s

TIME

70

— 100

AT AN LED CONTROL CIRCUIT
INCLUDED IN A COMPUTING DEVICE

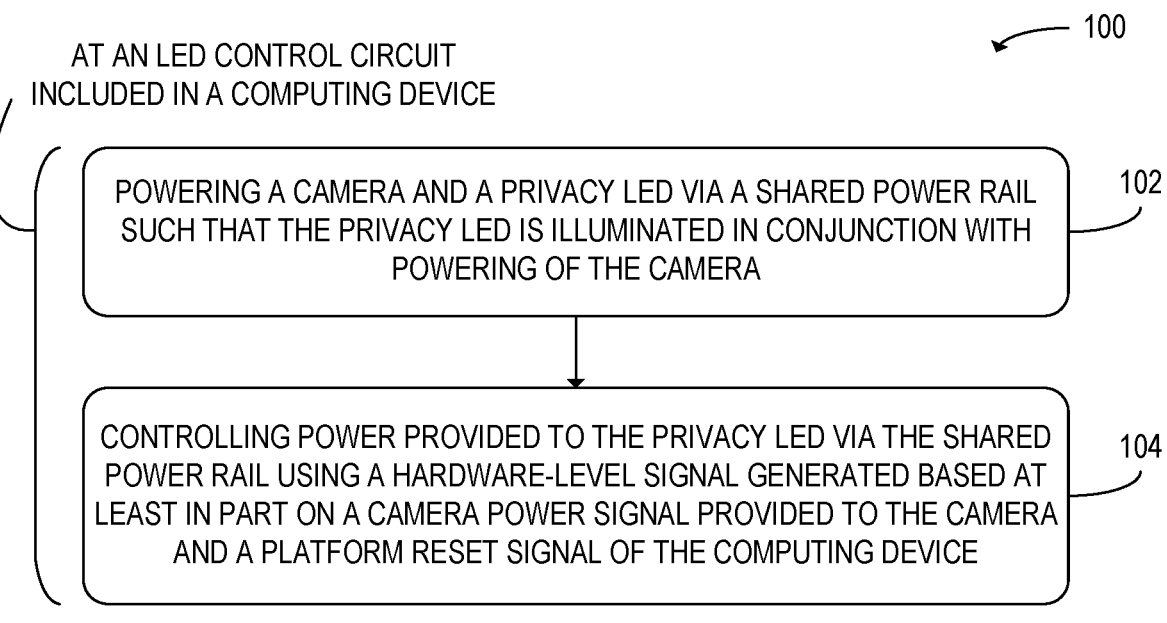

POWERING A CAMERA AND A PRIVACY LED VIA A SHARED POWER RAIL SUCH THAT THE PRIVACY LED IS ILLUMINATED IN CONJUNCTION WITH POWERING OF THE CAMERA    102

CONTROLLING POWER PROVIDED TO THE PRIVACY LED VIA THE SHARED POWER RAIL USING A HARDWARE-LEVEL SIGNAL GENERATED BASED AT LEAST IN PART ON A CAMERA POWER SIGNAL PROVIDED TO THE CAMERA AND A PLATFORM RESET SIGNAL OF THE COMPUTING DEVICE    104

FIG. 7A

AT THE LED CONTROL CIRCUIT

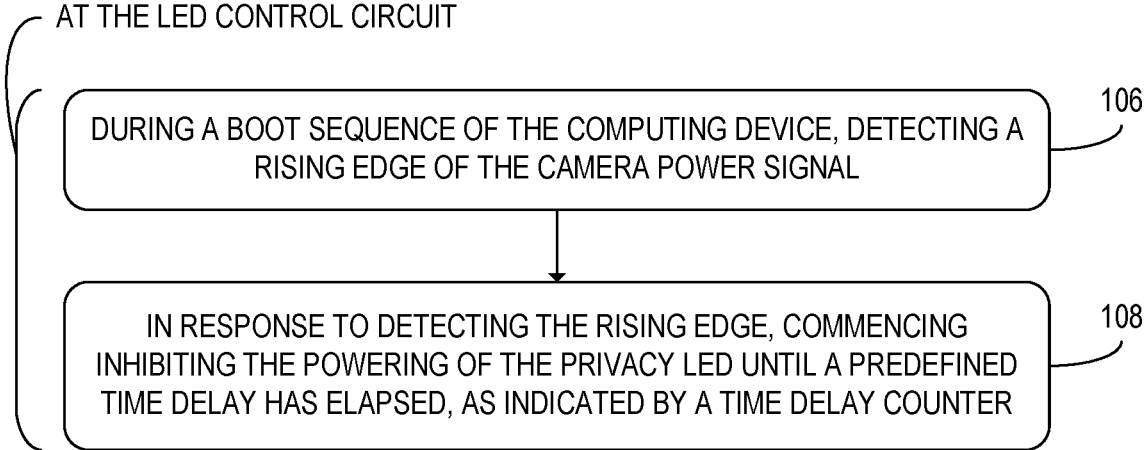

DURING A BOOT SEQUENCE OF THE COMPUTING DEVICE, DETECTING A RISING EDGE OF THE CAMERA POWER SIGNAL    106

IN RESPONSE TO DETECTING THE RISING EDGE, COMMENCING INHIBITING THE POWERING OF THE PRIVACY LED UNTIL A PREDEFINED TIME DELAY HAS ELAPSED, AS INDICATED BY A TIME DELAY COUNTER    108

FIG. 7B

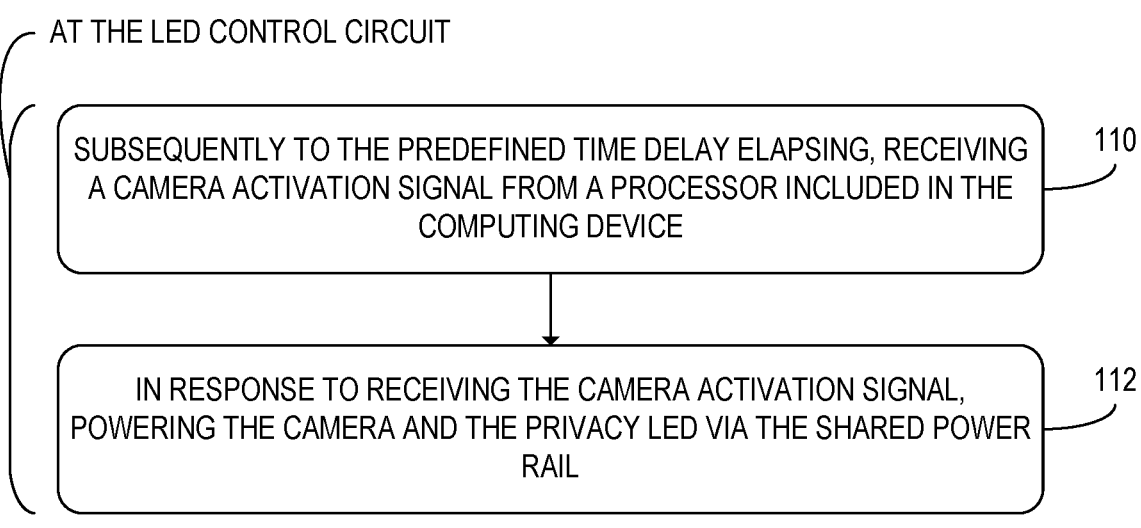

AT THE LED CONTROL CIRCUIT

SUBSEQUENTLY TO THE PREDEFINED TIME DELAY ELAPSING, RECEIVING A CAMERA ACTIVATION SIGNAL FROM A PROCESSOR INCLUDED IN THE COMPUTING DEVICE — 110

IN RESPONSE TO RECEIVING THE CAMERA ACTIVATION SIGNAL, POWERING THE CAMERA AND THE PRIVACY LED VIA THE SHARED POWER RAIL — 112

FIG. 7C

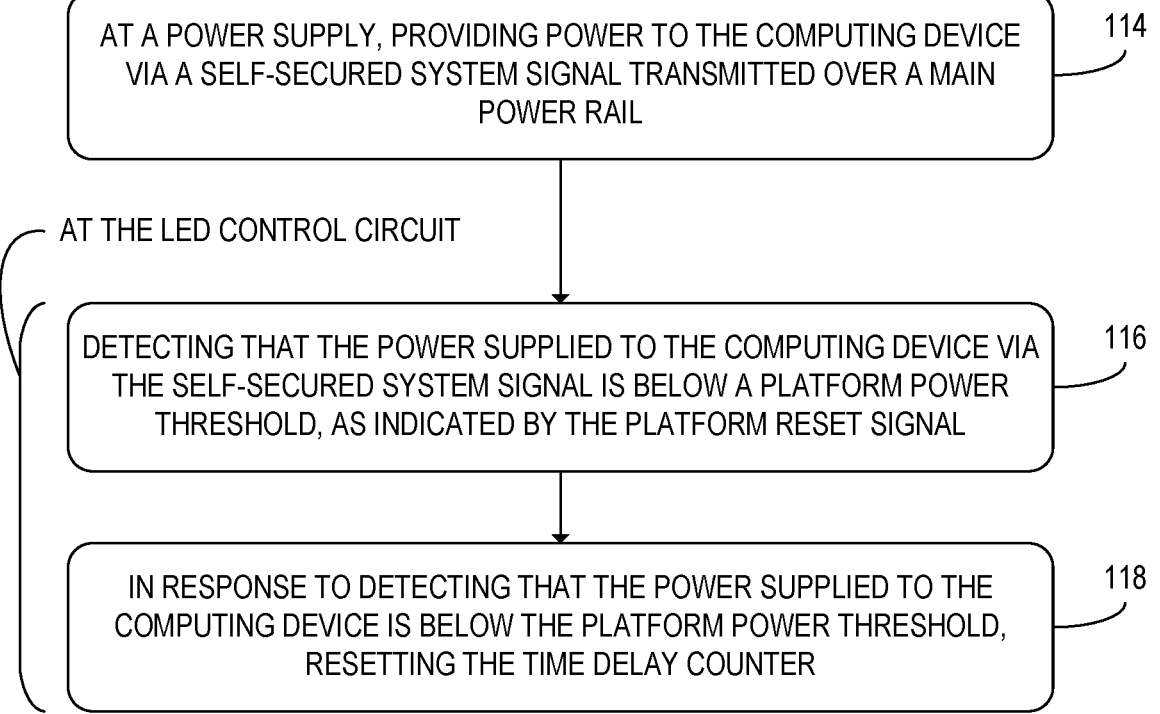

AT A POWER SUPPLY, PROVIDING POWER TO THE COMPUTING DEVICE VIA A SELF-SECURED SYSTEM SIGNAL TRANSMITTED OVER A MAIN POWER RAIL — 114

AT THE LED CONTROL CIRCUIT

DETECTING THAT THE POWER SUPPLIED TO THE COMPUTING DEVICE VIA THE SELF-SECURED SYSTEM SIGNAL IS BELOW A PLATFORM POWER THRESHOLD, AS INDICATED BY THE PLATFORM RESET SIGNAL — 116

IN RESPONSE TO DETECTING THAT THE POWER SUPPLIED TO THE COMPUTING DEVICE IS BELOW THE PLATFORM POWER THRESHOLD, RESETTING THE TIME DELAY COUNTER — 118

FIG. 7D

AT THE LED CONTROL CIRCUIT

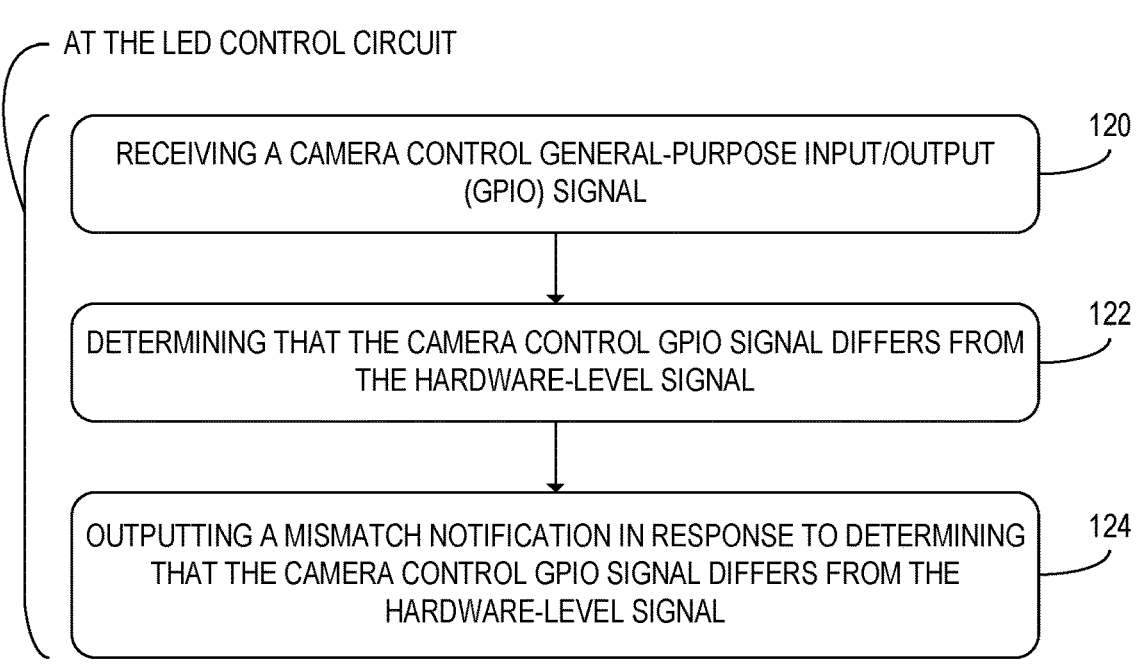

RECEIVING A CAMERA CONTROL GENERAL-PURPOSE INPUT/OUTPUT (GPIO) SIGNAL — 120

DETERMINING THAT THE CAMERA CONTROL GPIO SIGNAL DIFFERS FROM THE HARDWARE-LEVEL SIGNAL — 122

OUTPUTTING A MISMATCH NOTIFICATION IN RESPONSE TO DETERMINING THAT THE CAMERA CONTROL GPIO SIGNAL DIFFERS FROM THE HARDWARE-LEVEL SIGNAL — 124

FIG. 7E

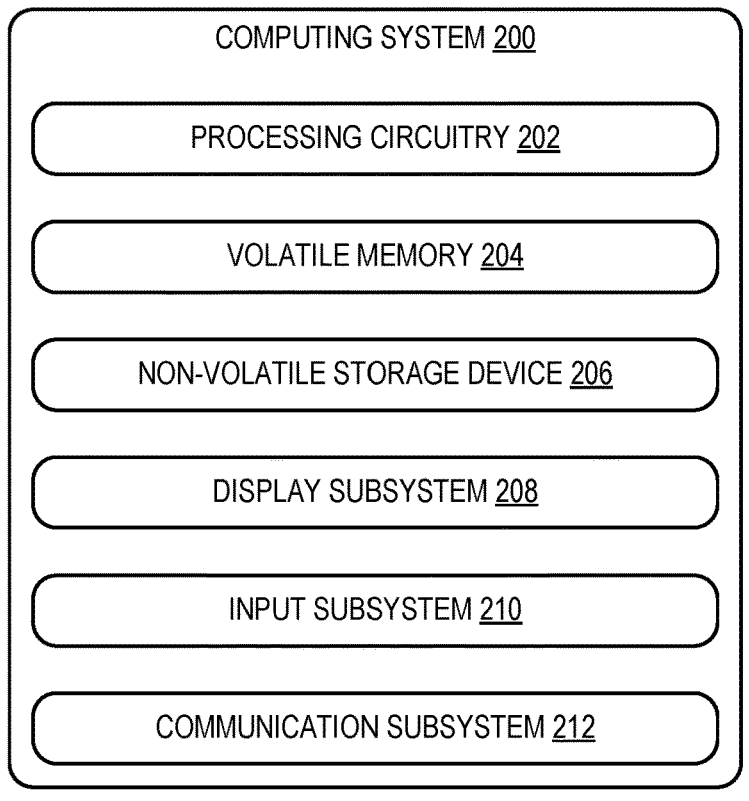

COMPUTING SYSTEM 200

PROCESSING CIRCUITRY 202

VOLATILE MEMORY 204

NON-VOLATILE STORAGE DEVICE 206

DISPLAY SUBSYSTEM 208

INPUT SUBSYSTEM 210

COMMUNICATION SUBSYSTEM 212

FIG. 8

PRIVACY LIGHT-EMITTING DIODE AND CONTROL CIRCUIT THEREOF

BACKGROUND

Some computing devices that utilize cameras also include privacy light-emitting diodes (LEDs). The privacy LED is illuminated in order to signal to the user, or to other people in the vicinity of the device, that the camera is in use. Thus, people in the vicinity of the computing device may be notified when the camera is imaging them.

SUMMARY

According to one aspect of the present disclosure, a computing device is provided, including a camera and a privacy light-emitting diode (LED) configured to be illuminated in conjunction with powering of the camera. The computing device further includes an LED control circuit configured to power the camera and the privacy LED via a shared power rail such that the privacy LED is illuminated. The LED control circuit controls power provided to the privacy LED via the shared power rail using a hardware-level signal. The hardware-level signal is generated based at least in part on a camera power signal provided to the camera and a platform reset signal of the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7A shows a flowchart of an example method for use with a computing device that includes a camera, a privacy LED, and an LED control circuit, according to the example of FIG. 1A.

FIGS. 7B-7E show additional steps of the method of FIG. 7A that may be performed in some examples.

FIG. 8 shows a schematic view of an example computing system in which the computing device of FIG. 1A may be instantiated.

DETAILED DESCRIPTION

In some previous configurations of computing devices that include privacy LEDs, the privacy LED is controlled at the software level. In such examples, software executed at the computing device determines that the camera is in a streaming mode. The streaming mode is a mode of operation in which the camera collects image data, either in the form of video or of individual images. When the software detects that the camera is in streaming mode, the software transmits a control signal to the privacy LED that causes the privacy LED to illuminate. For example, the privacy LED may be controlled by a general purpose input-output (GPIO) signal.

There is a risk that software control over the privacy LED may be vulnerable to malicious control of the privacy LED and camera. For example, it may be possible for malicious code to be executed such that the camera is operated in streaming mode without illuminating the privacy LED. The computing device may accordingly record image data of the user, or of another person in the vicinity of the device, without those people being aware that the computing device is imaging them. Thus, the privacy of such people may be compromised. There is also a risk that malicious code could additionally or alternatively illuminate the privacy LED without activating the camera.

Some alternative configurations of privacy LEDs couple the privacy LED to the camera at a hardware level. In such configurations, the camera and the privacy LED are included in a shared circuit, such that supplying electrical power to the camera also illuminates the privacy LED. Since the camera and the privacy LED are powered with a shared circuit, the camera and privacy LED are not separately controllable. Thus, the computing device is not vulnerable to software-based exploits in which the camera or the privacy LED is operated without operating the other.

In many computing devices that include cameras, high power is supplied to the camera during device startup, compared to the amounts of power that are supplied to the camera during operation of the computing device outside of streaming mode. Thus, in existing configurations that use a shared circuit to power the camera and the privacy LED, the privacy LED also illuminates during the boot sequence of the device. This illumination may erroneously indicate to users that the camera is imaging them.

Figure 1A:
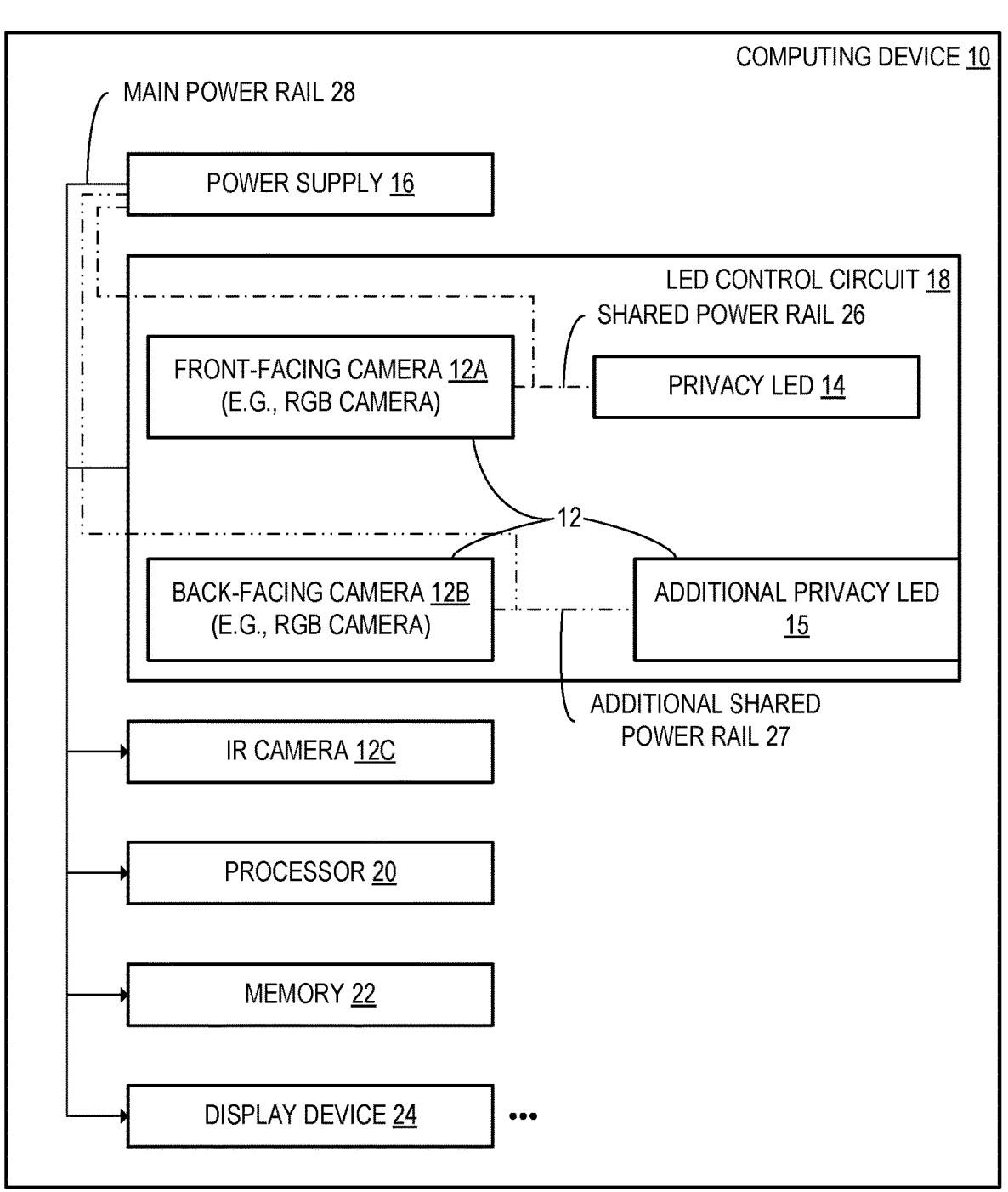
FIG. 1A schematically shows a computing device that includes one or more cameras, one or more privacy LEDs, and an LED control circuit, according to one example embodiment.
Figure 1B:
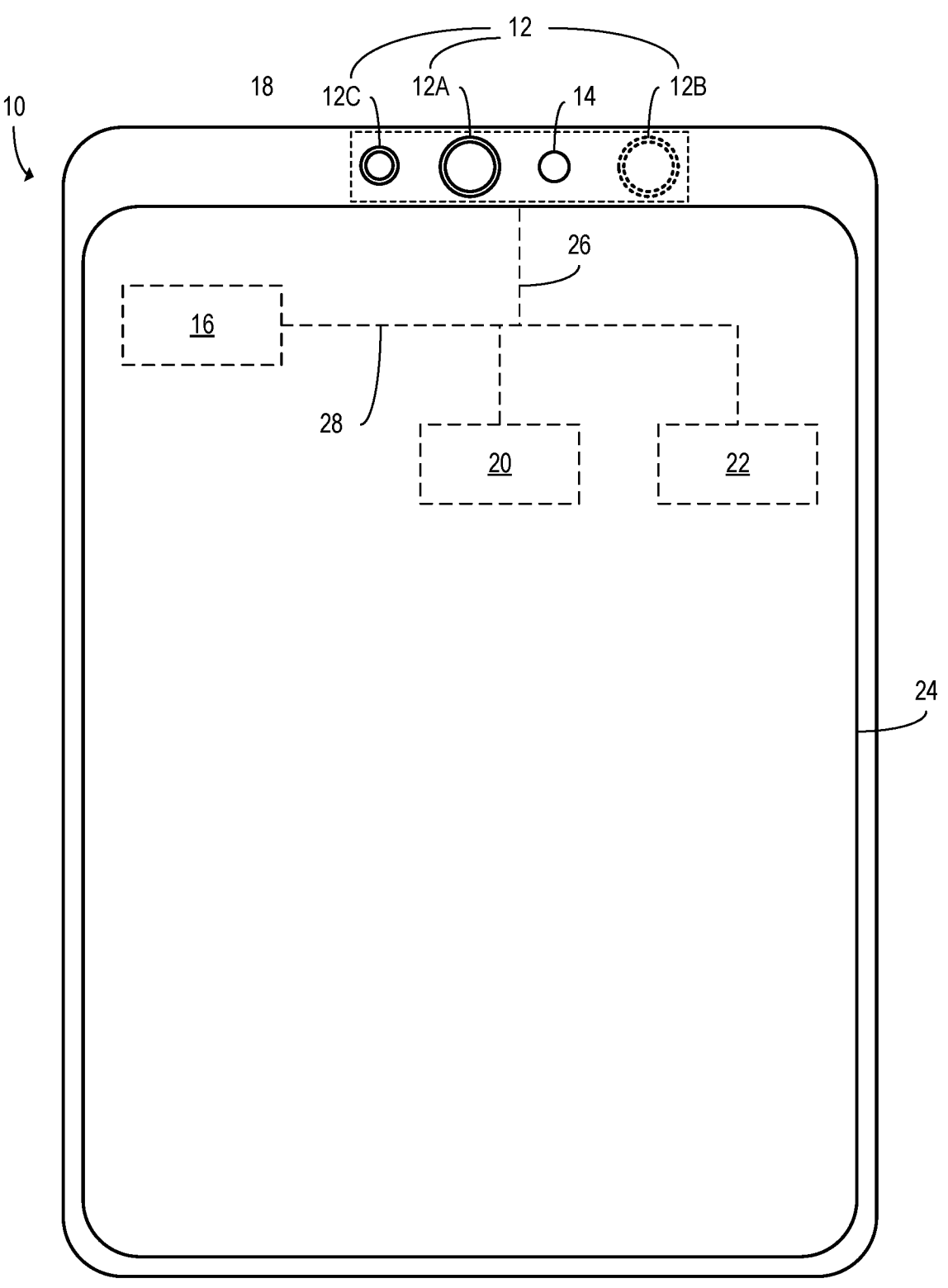
FIG. 1B schematically shows an example computing device that has a tablet form factor and includes a front-facing camera and a back-facing camera, according to the example of FIG. 1A.

In order to address the above challenges associated with privacy LEDs, the following computing device configuration is provided. FIG. 1A schematically shows a computing device 10 that includes one or more cameras 12. The one or more cameras 12, in the example of FIG. 1A, include a front-facing camera 12A, a back-facing camera 12B, and an infrared (IR) camera 12C. In other examples, some subset of the above camera types, and/or one or more additional camera types, may instead be included in the computing device 10. In the example of FIG. 1A, the computing device 10 further includes a display device 24. The front-facing camera 12A is configured to face in a same direction as the display device 24, whereas the back-facing camera 12B is configured to face away from the display device 24. FIG. 1B schematically shows an example computing device 10 that has a tablet form factor and includes a front-facing camera 12A and a back-facing camera 12B. The IR camera 12C is also a front-facing camera in the example of FIG. 1B. Returning to FIG. 1A, the front-facing camera 12A and the back-facing camera 12B may be red-green-blue (RGB) cameras.

Other components of the computing device 10 are also shown in FIGS. 1A-1B. The computing device 10 further includes a privacy LED 14 configured to be illuminated in conjunction with powering of at least one of the one or more cameras 12. In the example of FIG. 1A, the front-facing camera 12A is coupled to the privacy LED 14 via a shared power rail 26 coupled to a power supply 16 of the computing device 10. The shared power rail 26 is included in an LED control circuit 18 in the example of FIG. 1A. By powering the front-facing camera 12A and the privacy LED 14 with the shared power rail 26, the LED control circuit 18 matches the illumination status of the privacy LED 14 to the usage status of the front-facing camera 12A.

The power supply 16 may, for example, include a battery. An external power supply such as mains power may additionally or alternatively be used as a power supply 16 of the computing device 10. In the example of FIG. 1A, the power supply 16 is coupled to the electrically powered components of the computing device 10 via a main power rail 28. The main power rail 28 is configured to supply electrical power to the LED control circuit 18, the back-facing camera 12B, the IR camera 12C, a processor 20, memory 22, and the display device 24 in the example of FIG. 1A.

The back-facing camera 12B and the IR camera 12C may also be coupled to the privacy LED 14 by the shared power rail 26 in some examples. In other examples, the back-facing camera 12B and/or the IR camera 12C may be coupled to a respective additional privacy LED 15. The additional privacy LED 15 and the corresponding camera 12 may, in such examples, be coupled via an additional shared power rail 27 configured to be powered separately from the shared power rail 26. The back-facing camera 12B is coupled to an additional privacy LED 15 by an additional shared power rail 27 in the example of FIG. 1A.

In some examples, other components, such as one or more additional input devices and/or output devices, are also included in the computing device 10. Such additional components may also be coupled to the power supply 16 via the main power rail 28. Additionally or alternatively, one or more components of the computing device 10 may be powered separately by another power supply instead of receiving electrical power from the power supply 16 via the main power rail 28.

Figure 1C:
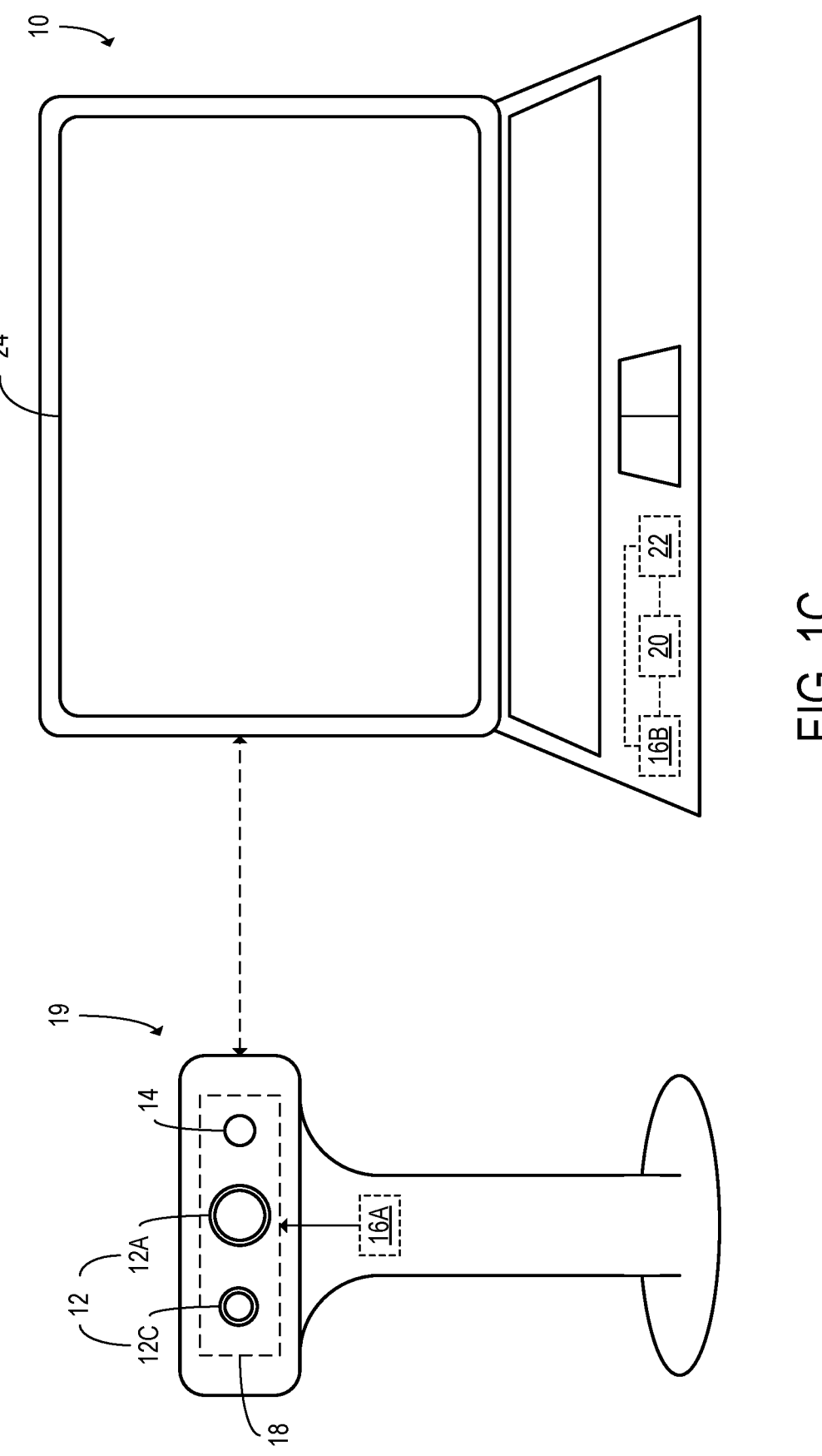
FIG. 1C schematically shows a front-facing camera, a privacy LED, and an LED control circuit included in an offboard camera device, according to the example of FIG. 1A.

FIG. 1C shows another configuration in which the front-facing camera 12A, privacy LED 14, and the LED control circuit 18 are included in an offboard camera device 19. The offboard camera device 19 is communicatively coupled with the computing device 10 in which the processor 20 and the memory 22 are included. In the example of FIG. 1C, the offboard camera device 19 is powered by an offboard camera device power supply 16A and the computing device 10 is powered by a computing device power supply 16B.

Figure 2A:
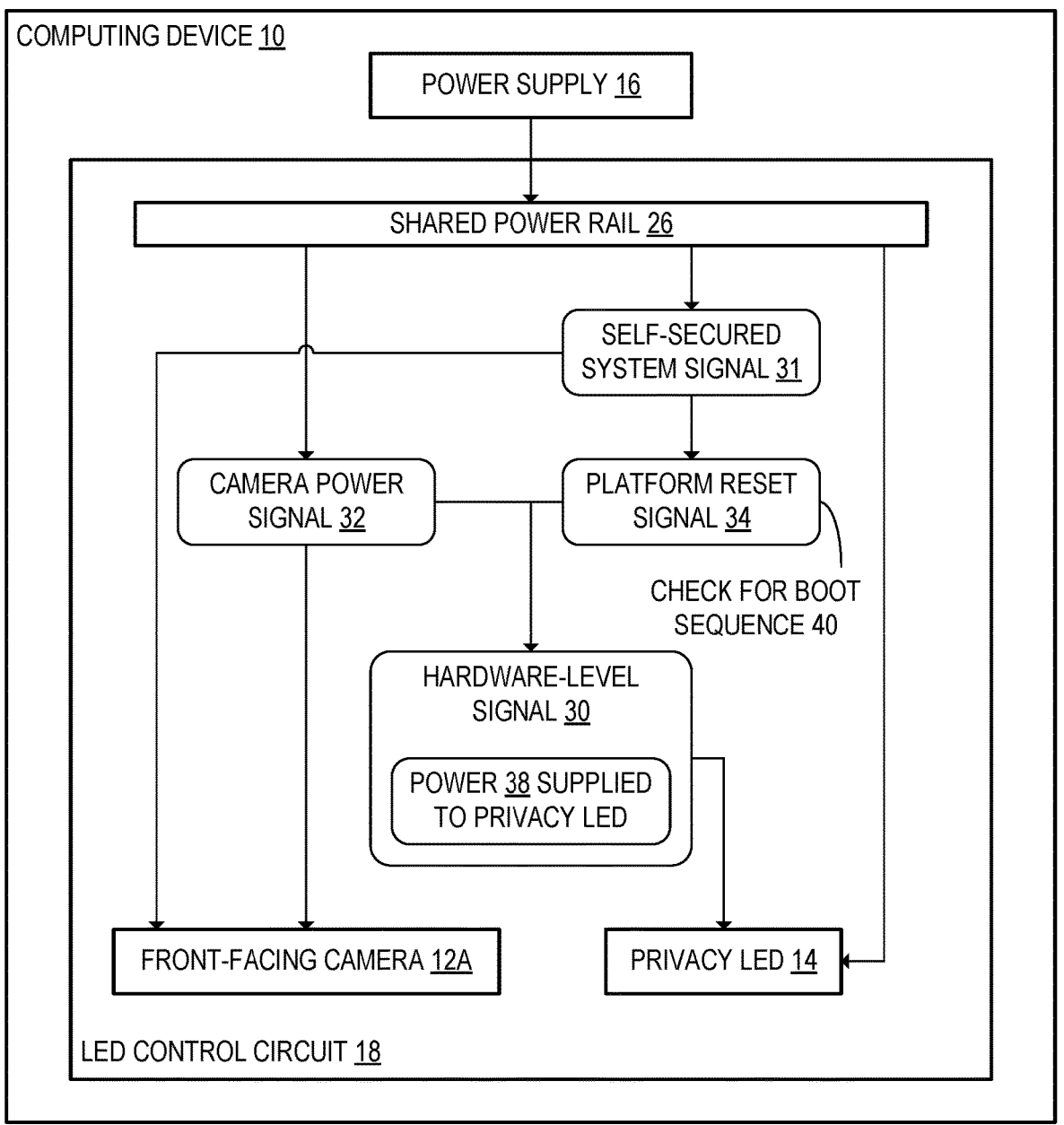
FIG. 2A schematically shows the computing device when the front-facing camera and the privacy LED are operated at the LED control circuit, according to the example of FIG. 1A.
Figure 2B:
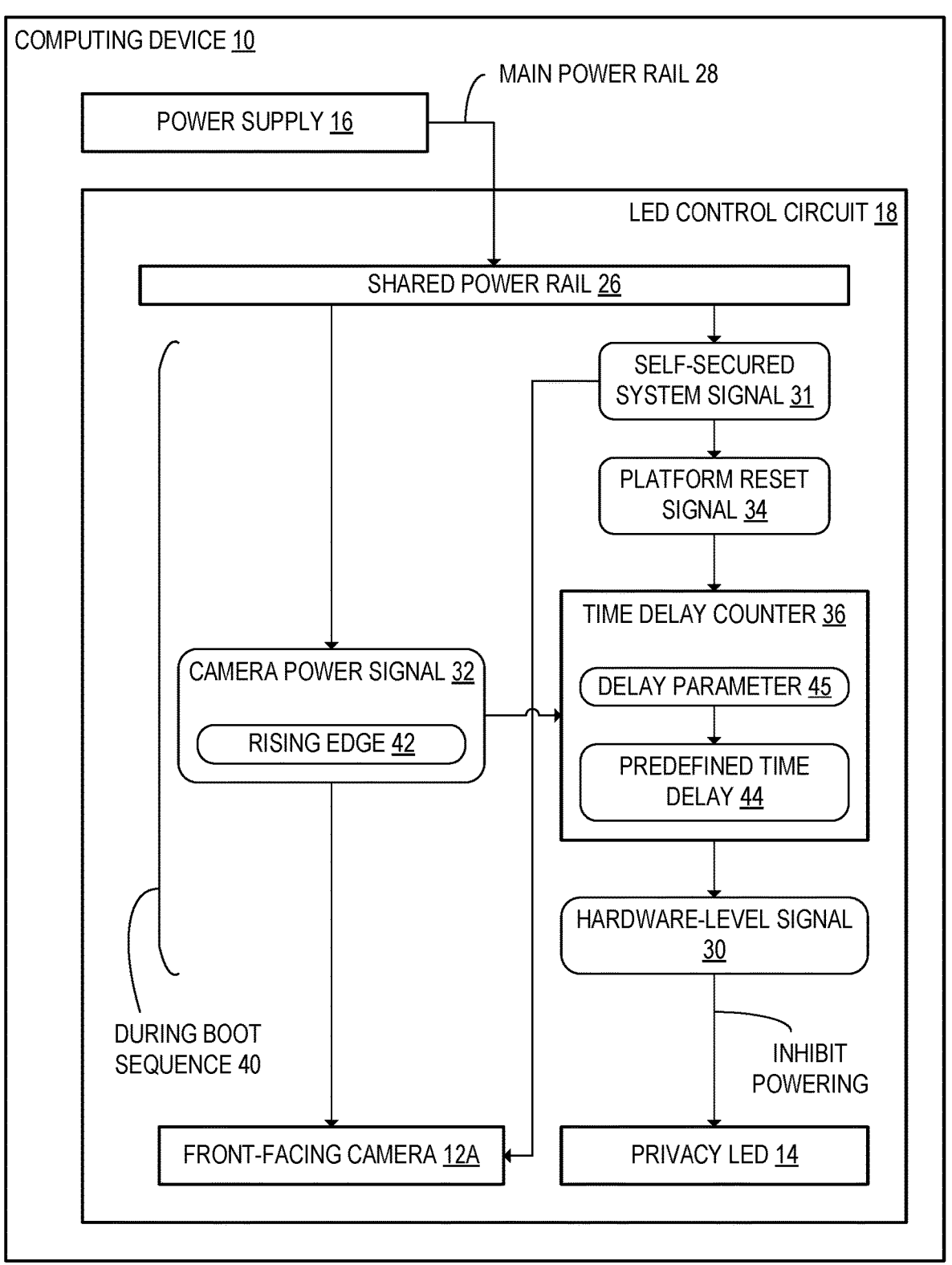
FIG. 2B schematically shows the computing device during a boot sequence, according to the example of FIG. 2A.
Figure 2C:
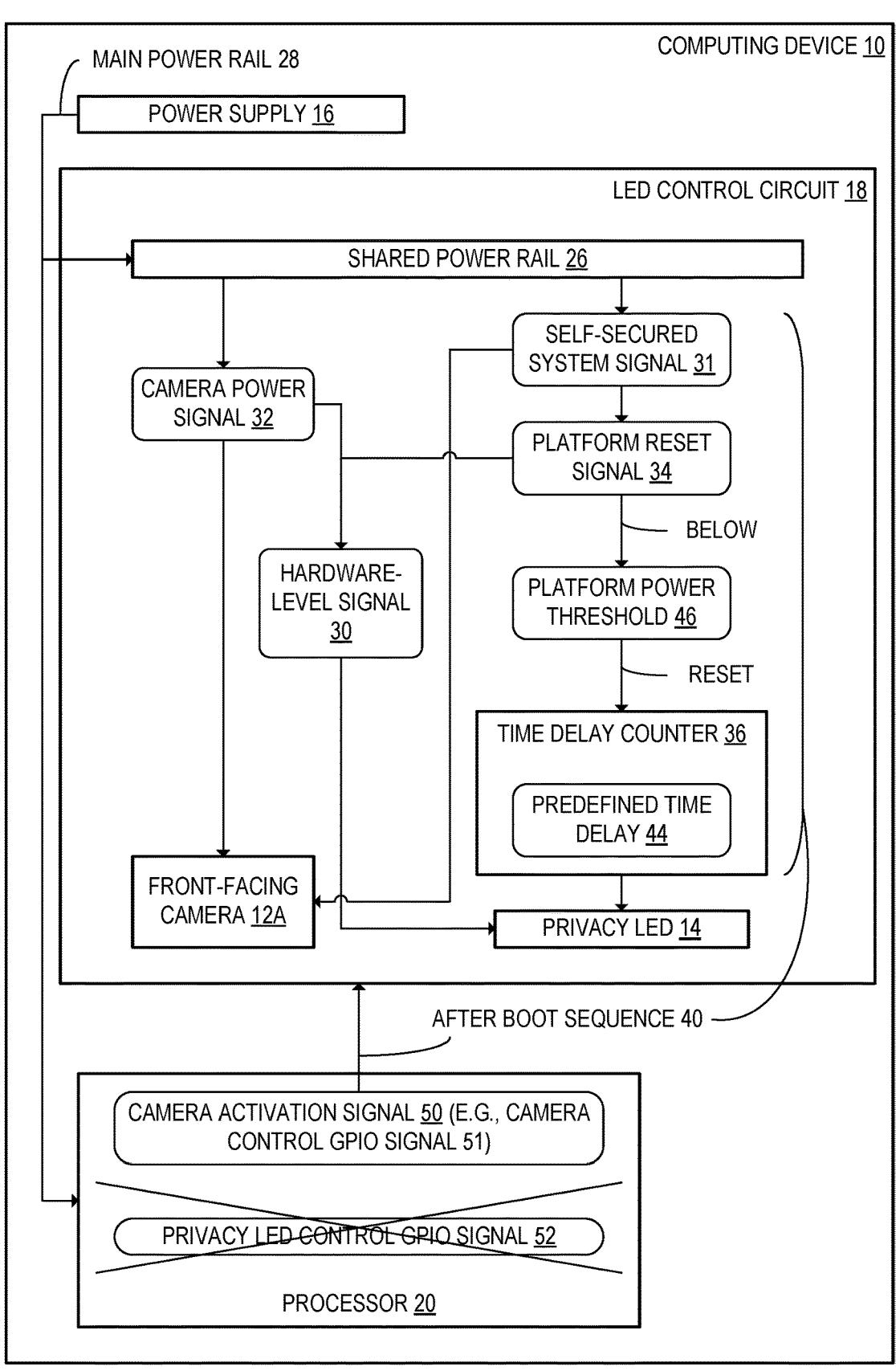
FIG. 2C schematically shows the computing device after the boot sequence, according to the example of FIG. 2A.

FIGS. 2A-2C schematically show the computing device 10 when the front-facing camera 12A and the privacy LED 14 are operated at the LED control circuit 18. As shown in the example of FIG. 2A, the LED control circuit 18 controls power 38 provided to the privacy LED 14 via the shared power rail 26 using a hardware-level signal 30. The hardware-level signal 30 is generated based at least in part on a camera power signal 32 provided to the camera 12 (the front-facing camera 12A, in the example of FIG. 2A) via the shared power rail 26.

In addition to the camera power signal 32, the LED control circuit 18 is further configured to power the camera 12 using a self-secured system signal 31. The power supply 16 is configured to provide power to the computing device 10 via the self-secured system signal 31 by transmitting the self-secured system signal 31 to different components of the computing device 10 via the main power rail 28. The LED control circuit 18 is configured to receive both the self-secured system signal 31 and the camera power signal 32 over the shared power rail 26. In some examples, the self-secured system signal 31 and the camera power signal 32 are, by themselves, both below a threshold amount of electrical power that activates the camera 12. However, in such examples, the self-secured system signal 31 and the camera power signal 32 can power the camera 12 when provided together. By utilizing a combination of the self-secured system signal 31 and the camera power signal 32 to power the camera 12, the LED control signal 18 is configured to prevent attacks in which the camera 12 is activated using amounts of electrical power that are too small to illuminate the privacy LED 14.

In addition, the LED control circuit 18 utilizes a platform reset signal 34 of the computing device 10 when generating the hardware-level signal 30. The platform reset signal 34 may indicate a device boot that occurs at the computing device 10 as a result of powering computing device components with the self-secured power signal 31. The LED control circuit 18 accordingly uses the platform reset signal 34 to determine whether the camera 12 is powered during or after a boot sequence 40.

FIG. 2B schematically shows the computing device 10 during a boot sequence 40. During the boot sequence 40, as depicted in the example of FIG. 2B, the LED control circuit 18 is configured to inhibit powering of the privacy LED 14 until a predefined time delay 44 has elapsed. Accordingly, the LED control circuit 18 is configured to prevent the privacy LED 14 from blinking during device startup. The predefined time delay 44, as discussed in further detail below, is a hardware parameter of the LED control circuit 18. The predefined time delay 44 is indicated by a time delay counter 36, which is a sub-circuit of the LED control circuit 18. The predefined time delay 44 may be set by selecting a delay parameter 45 of the time delay counter 36.

Although the LED control circuit 18 inhibits supplying power to the privacy LED 14 before the predefined time delay 44 has elapsed, the LED control circuit 18 may still be configured to supply power to the camera 12 during the boot sequence 40, according to some examples. The power provided to the camera 12 in such examples may include both the self-secured system signal 31 and the camera power signal 32. The camera 12 may, for example, be powered during the boot sequence 40 in order to load a camera driver.

During the boot sequence 40, as shown in FIG. 2B, the LED control circuit 18 is configured to detect a rising edge 42 of the camera power signal 32. The rising edge 42 indicates that the power supply 16 has begun powering the camera 12. The LED control circuit 18 is configured to wait for the predefined time delay 44 in response to detecting the rising edge 42.

FIG. 2C shows the computing device 10 after the boot sequence 40 has been performed. Subsequently to the predefined time delay 44 elapsing, the LED control circuit 18 is further configured to receive a camera activation signal 50 from the processor 20. The camera activation signal 50 includes instructions to operate the camera 12, and may, for example, be a camera control GPIO signal 51. However, according to the example of FIG. 2C, the LED control circuit 18 is configured to power the privacy LED 14 without receiving a privacy LED control general-purpose input/output (GPIO) signal 52 that is separate from the camera control GPIO signal 51. By not using a privacy LED control GPIO signal 52, the LED control circuit 18 is configured to prevent independent operation of the camera 12 and the privacy LED 14.

In response to receiving the camera activation signal 50, the LED control circuit 18 is configured to power the front-facing camera 12A and the privacy LED 14 via the shared power rail 26 such that the privacy LED 14 is illuminated. When the front-facing camera 12A and the privacy LED 14 are powered via the shared power rail 26, the camera power signal 32 is supplied to the front-facing camera 12A and the privacy LED 14 along with the self-secured system signal 31. Thus, during operation of the computing device 10 following the boot sequence 40, the privacy LED 14 is illuminated in conjunction with the front-facing camera 12A. This connection between camera and privacy LED operation is established at the hardware level, thereby preventing malicious use of the front-facing camera 12A independently of the privacy LED 14.

In some examples, the IR camera 12C may additionally or alternatively be operated in response to the LED control circuit 18 receiving a camera activation signal 50. The privacy LED 14 may also be illuminated in such examples. In examples in which the back-facing camera 12B receives a camera activation signal 50, the additional privacy LED 15 may be illuminated as a result of the power supply 16 powering the back-facing camera 12B and the additional privacy LED 15 via the additional shared power rail 27.

Subsequently to performing the boot sequence 40, as depicted in the example of FIG. 2C, the LED control circuit 18 is further configured to detect that a power supplied to the computing device 10 via the self-secured system signal 31 is below a platform power threshold 46. In response to detecting that the power supplied to the computing device 10 is below the platform power threshold 46, the LED control circuit 18 is further configured to reset the time delay counter 36. The LED control circuit 18 is accordingly configured to reset the time delay counter 36 in response to detecting that the computing device has powered down.

Figures 3, 4:
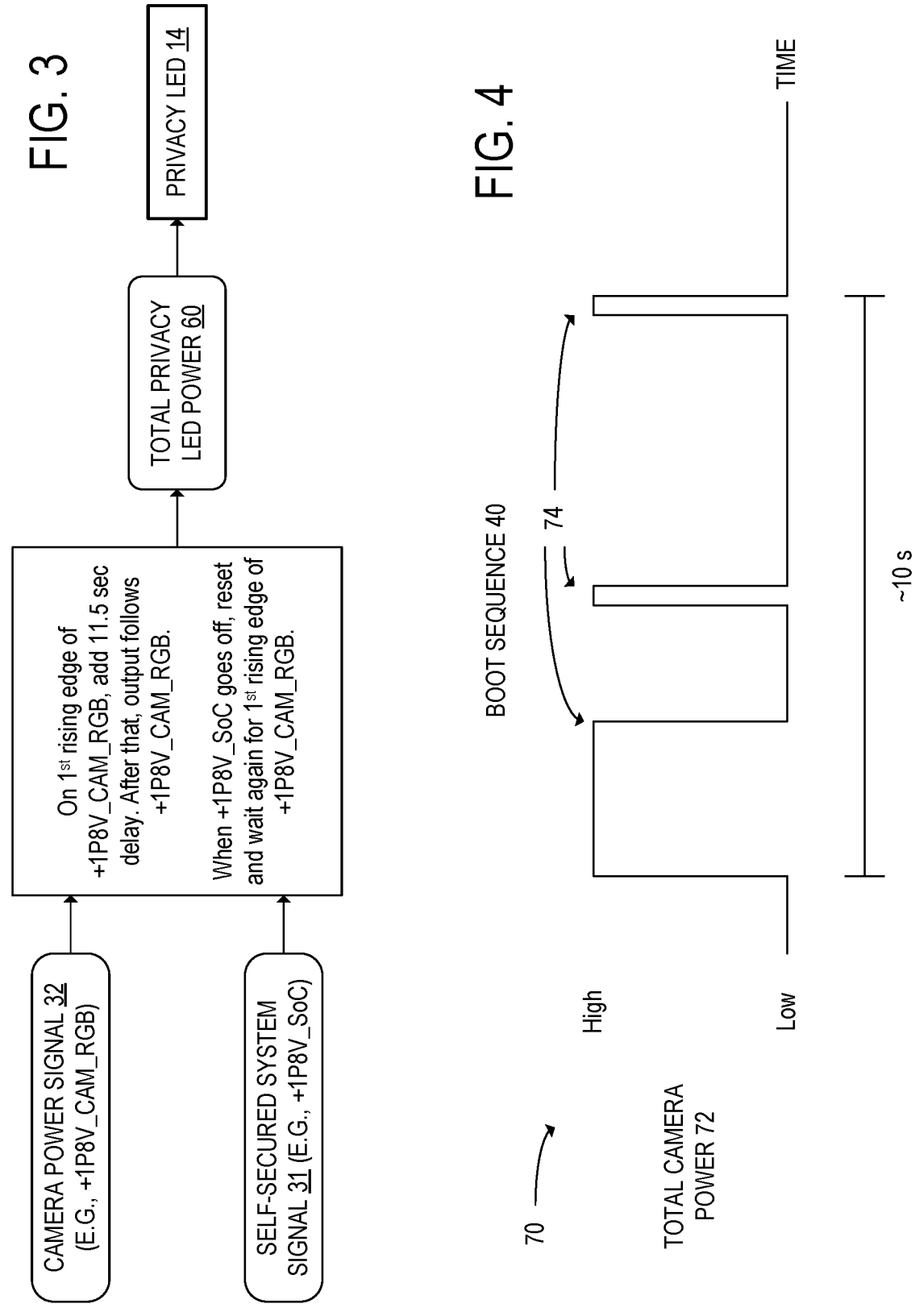
FIG. 3 schematically shows power signals supplied to the privacy LED, according to the example of FIG. 2A.
FIG. 4 schematically shows an example plot of a total camera power supplied to the camera over time during the boot sequence, according to the example of FIG. 2A.

FIG. 3 schematically shows power signals supplied to the privacy LED 14 via the shared power rail 26. The camera 12 is powered by a combination of the camera power signal 32 and the self-secured system signal 31, as discussed above, such that a total privacy LED power 60 is a sum of the camera power signal 32 and the self-secured system signal 31. The camera power signal is a 1.8V RGB camera signal in the example of FIG. 3, and the self-secured system signal 31 is a 1.8V system-on-a-chip (SoC) signal. On a first rising edge 42 of the camera power signal 32 in a current boot cycle, the LED control circuit 18 is configured to add the predefined time delay 44, which is an 11.5-second time delay in the example of FIG. 3. Subsequently to the predefined time delay 44 elapsing, the LED control circuit 18 is configured to power the privacy LED 14 using the camera power signal 32 whenever the camera 12 is active. When the self-secured system signal 31 turns off, the LED control circuit 18 is further configured to reset the time delay counter 36 so that the predefined time delay 44 can be applied during a subsequent boot sequence 40.

FIG. 4 schematically shows an example plot of a total camera power 72 supplied to the camera 12 over time during the boot sequence 40. In the example of FIG. 4, "high" indicates that the camera power signal 32 is supplied to the camera 12, whereas "low" indicates that the camera power signal 32 is not supplied to the camera 12. The example boot sequence 40 shown in FIG. 4 lasts for 10 seconds. This example boot sequence 40 includes multiple power spikes 74 in which the total camera power 72 is high. By using a predefined time delay 44 at the LED control circuit 18 instead of suppressing the powering of the privacy LED 14 specifically during the first power spike 74, the LED control circuit 18 also prevents the privacy LED 14 from blinking during the subsequent power spikes 74.

Figure 5A:
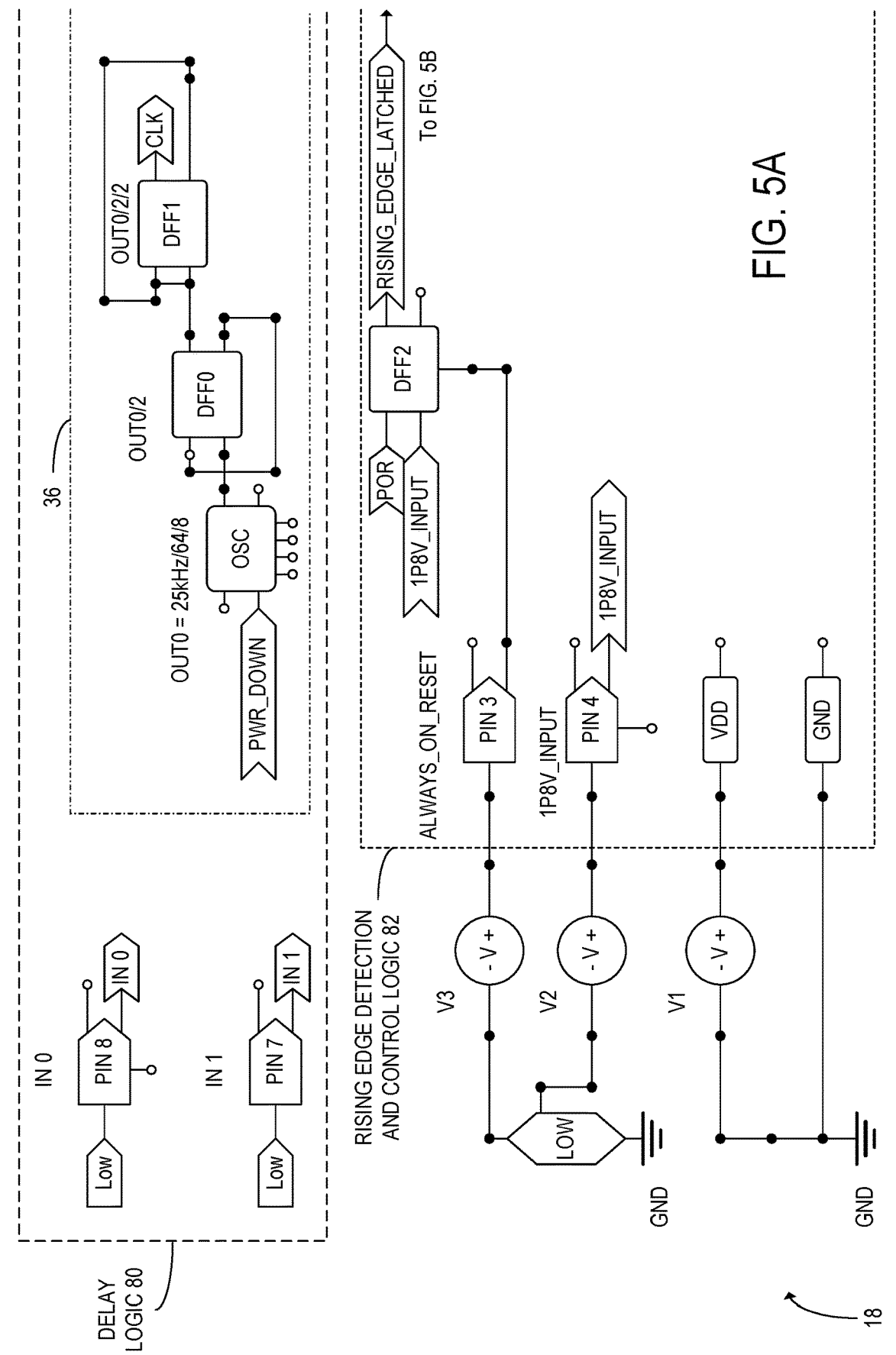
FIGS. 5A-5B schematically show the LED control circuit in additional detail, according to the example of FIG. 2A.
Figure 5B:
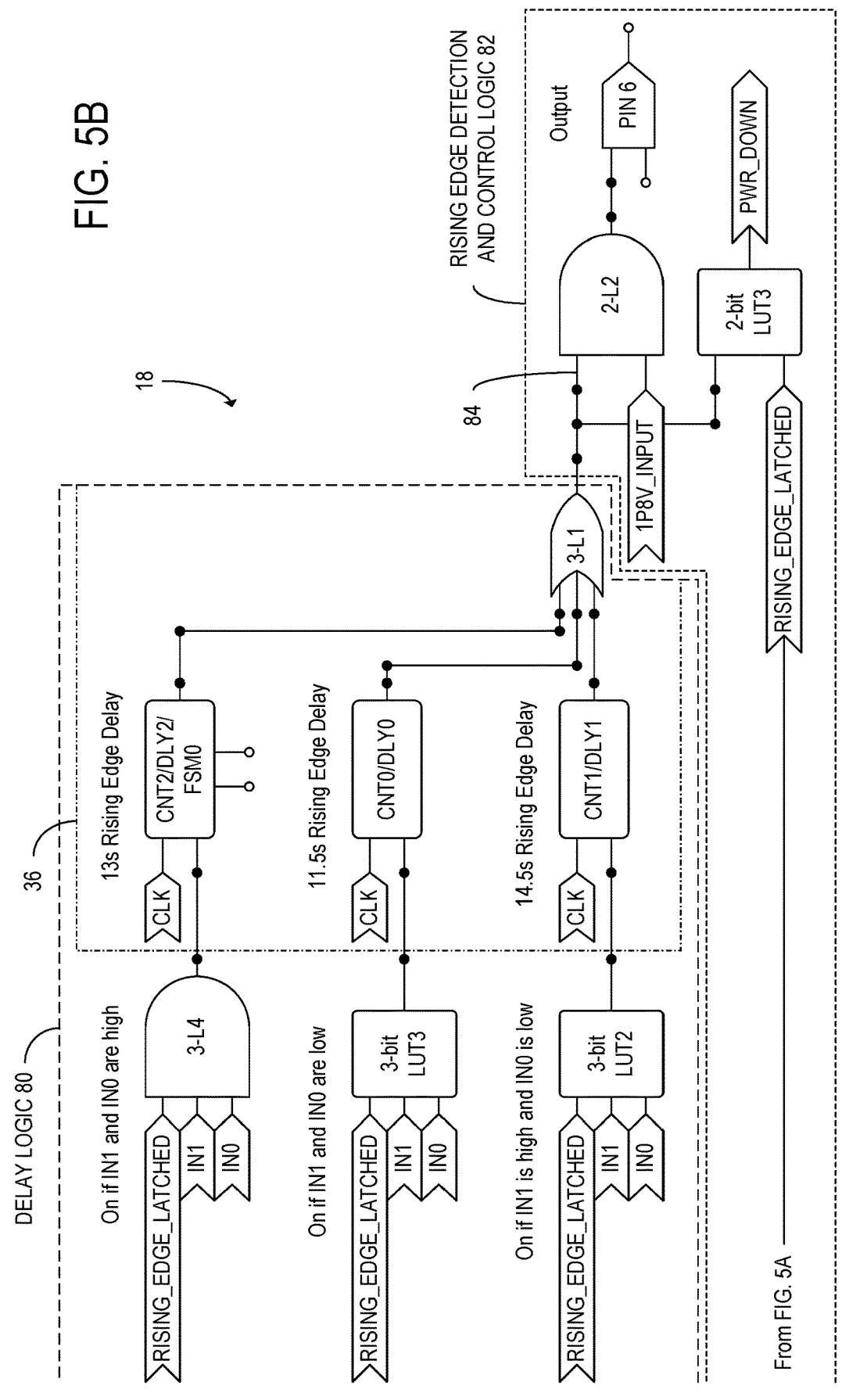

FIGS. 5A-5B schematically show the LED control circuit 18 in additional detail, according to one example. The LED control circuit 18 shown in FIGS. 5A-5B includes delay logic 80 via which the predefined time delay 44 is applied to the power 38 supplied to the privacy LED 14. The LED control circuit 18 further includes rising edge detection and control logic 82. At the rising edge detection and control logic 82, the LED control circuit 18 is configured to detect the rising edge 42 of the camera power signal 32 and reset the time delay counter 36 when the computing device 10 powers down.

At the delay logic 80, the LED control circuit 18 is configured to generate a clock signal CLK at the time delay counter 36. In the example of FIG. 5A, the clock signal CLK is generated using an oscillator OSC and two D flip-flop circuits DFF0 and DFF1. The oscillator OSC is configured to output a signal that oscillates at an input clock rate. The D flip-flop circuits DFF0 and DFF1 are each used to divide the input clock rate by two, such that the clock signal CLK has ¼ the frequency of the signal output by the oscillator OSC.

In the example of FIG. 5A-5B, the LED control circuit includes a plurality of lookup table integrated circuits, which are shown in FIG. 5B as the 3-bit LUT3, 3-bit LUT2, and 2-bit LUT3 circuits. These lookup table integrated circuits have the following truth tables:

3-bit LUT3:

| RISING_EDGE_LATCHED | IN1 | IN0 | OUT |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 1 |
| 1 | 0 | 1 | 0 |
| 1 | 1 | 0 | 0 |
| 1 | 1 | 1 | 0 |

3-bit LUT2:

| RISING_EDGE_LATCHED | IN1 | IN0 | OUT |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 1 |
| 1 | 1 | 1 | 0 |

2-bit LUT3:

| RISING_EDGE_LATCHED | IN1 | OUT |
|---|---|---|
| 0 | 0 | 0 |
| 0 | 1 | 0 |
| 1 | 0 | 1 |
| 1 | 1 | 0 |

In the example of FIGS. 5A-5B, the delay logic 80 further includes another AND gate 3-L4 that is used as a lookup table. This AND gate has the following truth table:

| RISING_EDGE_LATCHED | IN1 | IN0 | OUT |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

The lookup table integrated circuits 3-bit LUT3 and 3-bit LUT2, as well as the AND gate 3-LA, store a respective plurality of delay parameters 45. At the delay logic 80, the LED control circuit 18 is configured to set the time delay counter 36 to have the predefined time delay 44 at least in part by applying a delay parameter 45 of the plurality of delay parameters 45 to the time delay counter 36. In the example of FIGS. 5A-5B, the lookup table integrated circuit 3-bit LUT3 may be used to set a delay of 11.5 seconds, the lookup table integrated circuit 3-bit LUT2 may be used to set a delay of 14.5 seconds, and the AND gate 3-L4 may be used to set a delay of 13 seconds. Encoding the delay parameters 45 at the hardware level in the lookup table integrated circuits prevents modification of the delay parameters 45 by malicious software.

In order to generate a time delay counter output signal 84, the time delay counter 36 is further configured to input the clock signal CLK into counter integrated circuits CNT0/DLY0, CNT1/DLY1, and CNT2/DLY2/FSM0. The counter integrated circuit CNT0/DLY0 is further configured to receive an input signal from the lookup table integrated circuit 3-bit LUT3, the counter integrated circuit CNT1/DLY1 is further configured to receive an input signal from the lookup table integrated circuit 3-bit LUT2, and the counter integrated circuit CNT2/DLY2/FSM0 is further configured to receive an input signal from the AND gate 3-L4.

The LED control circuit 18 is further configured to generate the time delay counter output signal 84 at the delay logic 80 by inputting the output signals of the counter integrated circuits CNT0/DLY0, CNT1/DLY1, and CNT2/DLY2/FSM0 into an OR gate 3-L1. The OR gate 3-L1 has the following truth table:

| IN2 | IN1 | IN0 | OUT |
|---|---|---|---|
| 0 | 0 | 0 | 0 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 1 |

The rising edge detection and control logic 82 of the LED control circuit 18 further includes another flip-flop circuit, shown in the example of FIGS. 5A-5B as a D flip-flop circuit DFF2. The flip-flop circuit DFF2 is configured to receive the camera power signal 32 and the platform reset signal 34, which are respectively shown as 1P8V_INPUT and ALWAYS_ON_RESET in the example of FIGS. 5A-5B. The flip-flop circuit DFF2 also receives a default integrated circuit signal indicated as POR. The flip-flop circuit DFF2 is further configured to generate a latched rising edge signal RISING_EDGE_LATCHED based at least in part on the camera power signal 32 and the platform reset signal 34.

The example LED control circuit 18 further includes an AND gate 2-L2 configured to receive the latched rising edge signal RISING_EDGE_LATCHED. The AND gate 2-L2 is further configured to receive a time delay counter output signal 84 from the time delay counter 36. The AND gate 2-L2 is configured to control power provided to the privacy LED 14 based on the camera power signal 32 and the time delay counter output signal 84. The output signal of the AND gate 2-L2 is used as the hardware-level signal 30 that powers the privacy LED 14. The AND gate 2-L2 has the following truth table:

| 1P8V_INPUT | IN0 | IN1 |
|---|---|---|
| 0 | 0 | 0 |
| 0 | 1 | 0 |
| 1 | 0 | 0 |
| 1 | 1 | 1 |

The LED control circuit 18 is accordingly configured to generate the hardware-level signal 30.

Figure 6:
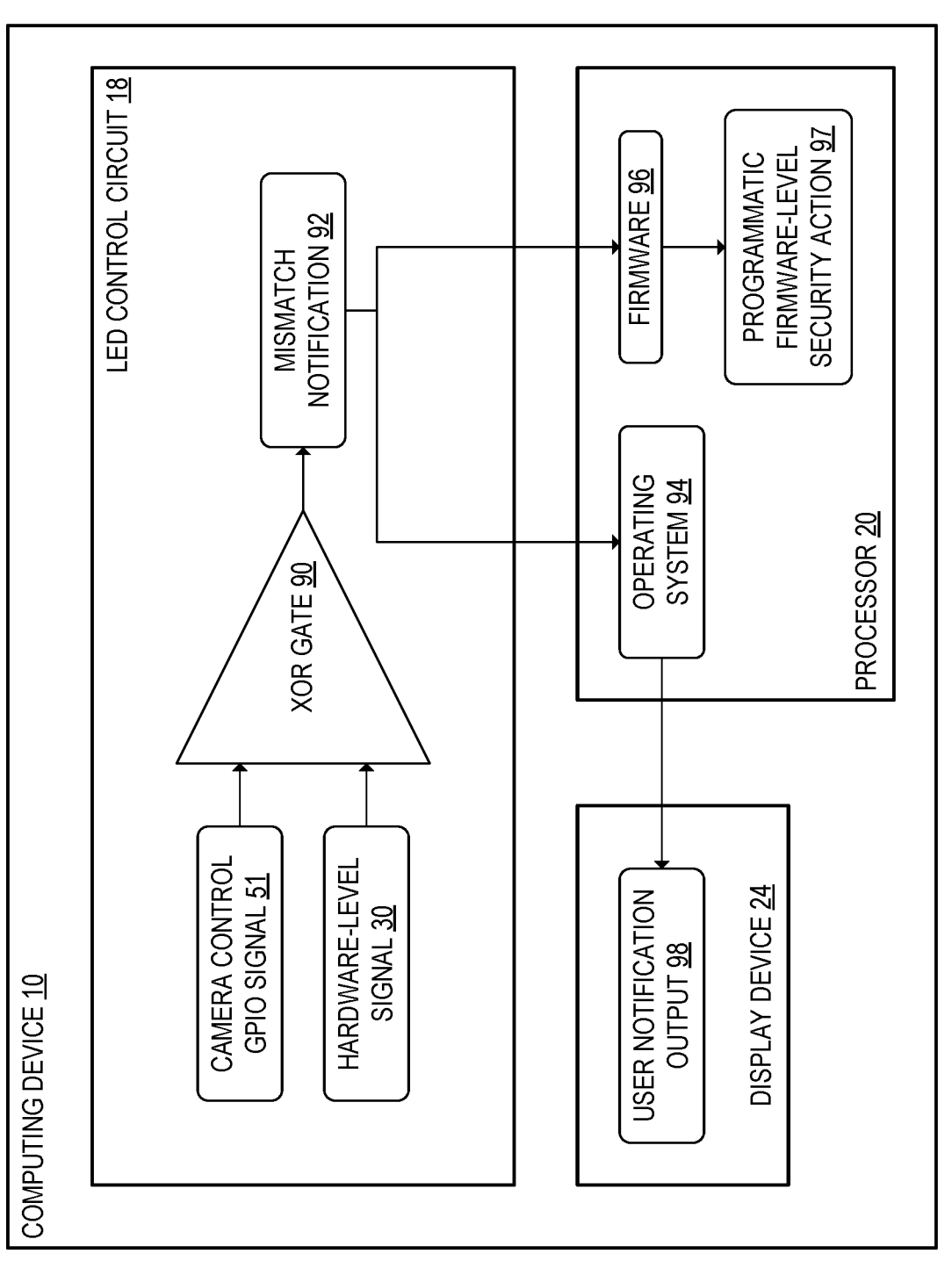
FIG. 6 schematically shows the computing device in an example in which the LED control circuit is configured to receive a camera control general-purpose input/output (GPIO) signal, according to the example of FIG. 2C.

FIG. 6 schematically shows the computing device 10 in an example in which the LED control circuit 18 is configured to receive a camera control GPIO signal 51, as discussed above with reference to FIG. 2C. In the example of FIG. 6, the LED control circuit 18 further includes an XOR gate 90. The XOR gate 90 is configured to receive the camera control GPIO signal and the hardware-level signal 30 and determine whether the camera control GPIO signal differs 51 from the hardware-level signal 30. Such a difference may indicate that malicious code is attempting to activate the camera 12 without activating the privacy LED 14.

In response to determining that the camera control GPIO signal 51 differs from the hardware-level signal 30, the LED control circuit 18 is further configured to output a mismatch notification 92. The LED control circuit 18 may, for example, transmit the mismatch notification 92 to an operating system 94 and/or firmware 96 executed at the processor 20. The processor 20 may, in response to receiving the mismatch notification 92, be configured to perform a programmatic firmware-level security action 97. For example, the programmatic firmware-level security action 97 may include executing instructions that disable GPIO control of the camera 12. In response to receiving the mismatch notification 92, the processor 20 may additionally or alternatively be configured to output a user notification output 98 to the display device 24. The user notification output 98 is generated at the operating system 94 in the example of FIG. 6. Thus, the user may be notified of a potentially unauthorized attempt to use the camera 12 without activating the privacy LED 14.

FIG. 7A shows a flowchart of an example method 100 for use with a computing device. The computing device at which the method 100 is performed includes a camera, a privacy LED, and an LED control circuit. In some examples, the computing device further includes a display device. In such examples, the camera may be a front-facing camera that faces in a same direction as the display device, and the privacy LED may be a front-facing privacy LED that faces in the same direction as the display device and the camera.

In some examples in which the camera is a front-facing camera, the front-facing camera may be a red-green-blue (RGB) camera. The computing device may further include an infrared camera (IR) that faces in the same direction as the display device. In such examples, the IR camera may be coupled to the shared power rail. The IR camera may share the privacy LED with the front-facing camera or may be coupled to an additional privacy LED. In some examples, the computing device additionally or alternatively includes a back-facing camera that faces away from the display device. The back-facing camera may be coupled to an additional privacy LED via an additional shared power rail in such examples.

At the LED control circuit included in the computing device, the method 100 includes, at step 102, powering a camera and a privacy LED via a shared power rail. The power provided to the camera and the privacy LED are received from a power supply such as a battery included in the computing device. When the camera and the privacy LED are powered with the shared power rail, the privacy LED is illuminated in conjunction with powering of the camera. Thus, the privacy LED may notify the user when the camera is in use.

At step 104, the method 100 further includes controlling power provided to the privacy LED via the shared power rail. The power is controlled using a hardware-level signal generated based at least in part on a camera power signal provided to the camera. In addition, the hardware-level signal is generated based at least in part on a platform reset signal of the computing device. The platform reset signal is a signal that indicates a device boot. The platform reset signal may be generated based at least in part on a self-secured system signal provided via a main power rail of the computing device.

FIG. 7B shows additional steps of the method 100 that may be performed at the LED control circuit. At step 106, the method 100 may further include detecting a rising edge of the camera power signal during a boot sequence of the computing device. At step 108, the method 100 may further include, in response to detecting the rising edge, commencing inhibiting the powering of the privacy LED until a predefined time delay has elapsed. The elapsing of the predefined time delay is indicated by a time delay counter included in the LED control circuit. The LED control circuit may accordingly prevent the privacy LED from blinking during the boot sequence when a camera driver is loaded.

FIG. 7C shows additional steps of the method 100 that may be performed at the LED control circuit. At step 110, subsequently to the predefined time delay elapsing, the method 100 may further include receiving a camera activation signal from a processor included in the computing device. For example, the camera activation signal may be a camera control GPIO signal. At step 112, the method 100 may further include powering the camera and the privacy LED via the shared power rail in response to receiving the camera activation signal. Thus, the powering of the privacy LED is not inhibited after the predefined time delay has elapsed.

FIG. 7D shows additional steps of the method 100 that may be performed in some examples. At step 114, the method 100 may include, at a power supply, providing power to the computing device via a self-secured system signal transmitted over a main power rail. The self-secured system signal is a power signal that may be provided to a plurality of different components of the computing device. At step 116, the method 100 may further include detecting that the power supplied to the computing device via the self-secured system signal is below a platform power threshold, as indicated by the platform reset signal. This detection may indicate that the computing device has shut down. In response to detecting that the power supplied to the computing device is below the platform power threshold, the method 100 may further include, at step 118, resetting the time delay counter. The time delay counter is accordingly reset when the computing device is shut down, thereby allowing the time delay counter to be used for blinking prevention during a subsequent boot of the computing device.

FIG. 7E shows additional steps of the method 100 that may be performed at the LED control circuit. At step 120, the method 100 may further include receiving a camera control GPIO signal. The camera control GPIO signal may, for example, be received from a processor included in the computing device. At step 122, the method 200 may further include determining that the camera control GPIO signal differs from the hardware-level signal with which the privacy LED is controlled. This determination may be made at an XOR gate included in the LED control circuit. At step 122, the method 100 may further include outputting a mismatch notification in response to determining that the camera control GPIO signal differs from the hardware-level signal. The mismatch signal may, for example, be output to an operating system or firmware executed at the processor. In such examples, the operating system may output a user notification output. The firmware may additionally or alternatively perform a programmatic firmware-level security action such as inhibiting GPIO control of the camera.

Using the devices and methods discussed above, a privacy LED is controlled at a hardware level. This hardware-level control inhibits independent control of the camera and the privacy LED, thereby preventing unauthorized activation of the camera without illumination of the privacy LED. The LED control circuit that controls the privacy LED also introduces a time delay during device startup, which prevents the privacy LED from blinking. This time delay prevents the privacy LED from erroneously notifying the user that the camera is imaging the user. The LED control circuit may also output a notification when a control signal attempts to control the camera independently from the privacy LED, thereby providing an additional layer of camera security.

The methods and processes described herein are tied to a computing system of one or more computing devices. In particular, such methods and processes can be implemented as a computer-application program or service, an application-programming interface (API), a library, and/or other computer-program product.

FIG. 8 schematically shows a non-limiting embodiment of a computing system 200 that can enact one or more of the methods and processes described above. Computing system 200 is shown in simplified form. Computing system 200 may embody the computing device 10 described above and illustrated in FIG. 1A. Components of computing system 200 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 200 includes processing circuitry 202, volatile memory 204, and a non-volatile storage device 206. Computing system 200 may optionally include a display subsystem 208, input subsystem 210, communication subsystem 212, and/or other components not shown in FIG. 8.

Processing circuitry 202 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 202 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 202.

Non-volatile storage device 206 includes one or more physical devices configured to hold instructions executable by the processing circuitry to implement the methods and processes described herein. When such methods and processes are implemented, the state of non-volatile storage device 206 may be transformed—e.g., to hold different data.

Non-volatile storage device 206 may include physical devices that are removable and/or built in. Non-volatile storage device 206 may include optical memory, semiconductor memory, and/or magnetic memory, or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by processing circuitry 202 to temporarily store information during processing of software instructions. It will be appreciated that volatile memory 204 typically does not continue to store instructions when power is cut to the volatile memory 204.

Aspects of processing circuitry 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via processing circuitry 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with processing circuitry 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, camera, or microphone.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 200 to send and/or receive messages to and/or from other devices via a network such as the Internet.

The following paragraphs discuss several aspects of the present disclosure. According to one aspect of the present disclosure, a computing device is provided, including a camera. The computing device further includes a privacy light-emitting diode (LED) configured to be illuminated in conjunction with powering of the camera. The computing device further includes an LED control circuit configured to power the camera and the privacy LED via a shared power rail such that the privacy LED is illuminated. The LED control circuit controls power provided to the privacy LED via the shared power rail using a hardware-level signal generated based at least in part on a camera power signal provided to the camera and a platform reset signal of the computing device. The above features may have the technical effect of providing hardware-level synchronization of privacy LED illumination with activation of the camera.

According to this aspect, wherein the LED control circuit may be further configured to, during a boot sequence of the computing device, detect a rising edge of the camera power signal. In response to detecting the rising edge, the LED control circuit may be further configured to commence inhibiting the powering of the privacy LED until a predefined time delay has elapsed, as indicated by a time delay counter. The above features may have the technical effect of preventing the privacy LED from blinking during the boot sequence.

According to this aspect, the computing device may further include a processor. The LED control circuit may be further configured to receive a camera activation signal from the processor subsequently to the predefined time delay elapsing. The LED control circuit may be further configured to power the camera and the privacy LED via the shared power rail in response to receiving the camera activation signal. The above features may have the technical effect of concurrently activating the camera and the privacy LED subsequently to the boot sequence.

According to this aspect, the LED control circuit may further include a flip-flop circuit configured to receive the camera power signal and the platform reset signal. The flip-flop circuit may be further configured to generate a latched rising edge signal based at least in part on the camera power signal and the platform reset signal. The above features may have the technical effect of detecting camera activation during the boot sequence.

According to this aspect, the LED control circuit may further include an AND gate configured to receive the latched rising edge signal. The AND gate may be further configured to receive a time delay counter output signal from the time delay counter. The AND gate may be further configured to control power provided to the privacy LED based at least on the camera power signal and the time delay counter output signal. The above features may have the technical effect of determining whether to power the privacy LED based at least in part on whether the time delay has elapsed.

According to this aspect, a power supply may be configured to provide power to the computing device via a self-secured system signal transmitted over a main power rail. The LED control circuit may be further configured to detect that the power supplied to the computing device via the self-secured system signal is below a platform power threshold, as indicated by the platform reset signal. The LED control circuit may be further configured to reset the time delay counter in response to detecting that the power supplied to the computing device is below the platform power threshold. The above features may have the technical effect of preparing the LED control circuit to apply the time delay during a subsequent boot sequence.

According to this aspect, the camera, the privacy LED, and the LED control circuit may be included in an offboard camera device that is configured to receive the camera activation signal from an offboard computing device in which the processor is located. The above features may have the technical effect of concurrently powering the camera and privacy LED of an offboard camera device.

According to this aspect, the LED control circuit may include a plurality of lookup table integrated circuits. The lookup table integrated circuits may store a respective plurality of delay parameters. The LED control circuit may be configured to set the time delay counter to have the predefined time delay at least in part by applying a delay parameter of the plurality of delay parameters to the time delay counter. The above features may have the technical effect of preventing modification of the time delay by malicious software.

According to this aspect, the computing device may further include a display device. The camera may be a front-facing camera that faces in a same direction as the display device. The privacy LED may be a front-facing privacy LED that faces in the same direction as the display device. The above features may have the technical effect of making the privacy LED visible to a user when the user is viewing the display and using the front-facing camera.

According to this aspect, the front-facing camera may be a red-green-blue (RGB) camera. The computing device may further include an infrared camera (IR) that faces in the same direction as the display device. The IR camera may be coupled to the shared power rail. The above features may have the technical effect of allowing the computing device to collect image data in multiple different wavelength ranges.

According to this aspect, the LED control circuit is configured to power the privacy LED without receiving a privacy LED control general-purpose input/output (GPIO) signal. The above features may have the technical effect of preventing malicious independent control of the camera and privacy LED through separate GPIO signals.

According to this aspect, the LED control circuit may be further configured to receive a camera control general-purpose input/output (GPIO) signal. The LED control circuit may be further configured to determine that the camera control GPIO signal differs from the hardware-level signal. The LED control circuit may be further configured to output a mismatch notification in response to determining that the camera control GPIO signal differs from the hardware-level signal. The above features may have the technical effect of detecting and responding to malicious attempts to utilize the camera.

According another aspect of the present disclosure, a method for use with a computing device is provided. The method includes, at an LED control circuit included in the computing device, powering a camera and a privacy LED via a shared power rail such that the privacy LED is illuminated in conjunction with powering of the camera. The method further includes controlling power provided to the privacy LED via the shared power rail using a hardware-level signal generated based at least in part on a camera power signal provided to the camera and a platform reset signal of the computing device. The above features may have the technical effect of providing hardware-level synchronization of privacy LED illumination with activation of the camera.

According to this aspect, the method may further include, during a boot sequence of the computing device, detecting a rising edge of the camera power signal at the LED control circuit. The method may further include, in response to detecting the rising edge, commencing inhibiting the powering of the privacy LED until a predefined time delay has elapsed, as indicated by a time delay counter. The above features may have the technical effect of preventing the privacy LED from blinking during the boot sequence.

According to this aspect, the method may further include, at the LED control circuit, receiving a camera activation signal from a processor included in the computing device subsequently to the predefined time delay elapsing. The method may further include, in response to receiving the camera activation signal, powering the camera and the privacy LED via the shared power rail. The above features may have the technical effect of concurrently activating the camera and the privacy LED subsequently to the boot sequence.

According to this aspect, the method may further include, at a power supply, providing power to the computing device via a self-secured system signal transmitted over a main power rail. The method may further include, at the LED control circuit, detecting that the power supplied to the computing device via the self-secured system signal is below a platform power threshold, as indicated by the platform reset signal. The method may further include resetting the time delay counter in response to detecting that the power supplied to the computing device is below the platform power threshold. The above features may have the technical effect of preparing the LED control circuit to apply the time delay during a subsequent boot sequence.

According to this aspect, the computing device may further include a display device. The camera may be a front-facing camera that faces in a same direction as the display device. The privacy LED may be a front-facing privacy LED that faces in the same direction as the display device. The above features may have the technical effect of making the privacy LED visible to a user when the user is viewing the display and using the front-facing camera.

According to this aspect, the front-facing camera may be a red-green-blue (RGB) camera. The computing device may further include an infrared camera (IR) that faces in the same direction as the display device. The IR camera may be coupled to the shared power rail. The above features may have the technical effect of allowing the computing device to collect image data in multiple different wavelength ranges.

According to this aspect, the method may further include, at the LED control circuit, receiving a camera control general-purpose input/output (GPIO) signal. The method may further include determining that the camera control GPIO signal differs from the hardware-level signal. The method may further include outputting a mismatch notification in response to determining that the camera control GPIO signal differs from the hardware-level signal. The above features may have the technical effect of detecting and responding to malicious attempts to utilize the camera.

According to another aspect of the present disclosure, a computing device is provided, including a camera and a privacy light-emitting diode (LED) configured to be illuminated in conjunction with powering of the camera. The computing device further includes a processor and an LED control circuit. The LED control circuit is configured to, during a boot sequence of the computing device, inhibit powering of the privacy LED until a predefined time delay has elapsed. The LED control circuit is further configured to, subsequently to the predefined time delay elapsing, receive a camera activation signal from the processor. In response to receiving the camera activation signal, the LED control circuit is further configured to power the camera and the privacy LED via a shared power rail such that the privacy LED is illuminated. The above features may have the technical effect of providing hardware-level synchronization of privacy LED illumination with activation of the camera.

"And/or" as used herein is defined as the inclusive or V, as specified by the following truth table:

| A | B | A $\vee$ B |
|---|---|---|
| True | True | True |
| True | False | True |

-continued

| A | B | A $\vee$ B |
|---|---|---|
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   a camera;
   a privacy light-emitting diode (LED) configured to be illuminated in conjunction with powering of the camera; and
   an LED control circuit configured to power the camera and the privacy LED via a shared power rail such that the privacy LED is illuminated, wherein the LED control circuit controls power provided to the privacy LED via the shared power rail using a hardware-level signal generated based at least in part on:
      a camera power signal provided to the camera; and
      a platform reset signal of the computing device, wherein the platform reset signal indicates a device boot that occurs at the computing device.

2. The computing device of claim 1, wherein the LED control circuit is further configured to:
   during a boot sequence of the computing device, detect a rising edge of the camera power signal; and
   in response to detecting the rising edge, commence inhibiting the powering of the privacy LED until a predefined time delay has elapsed, as indicated by a time delay counter.

3. The computing device of claim 2, wherein:
   the computing device further includes a processor; and
   the LED control circuit is further configured to:
      subsequently to the predefined time delay elapsing, receive a camera activation signal from the processor; and
      in response to receiving the camera activation signal, power the camera and the privacy LED via the shared power rail.

4. The computing device of claim 3, wherein the LED control circuit further includes a flip-flop circuit configured to:
   receive the camera power signal and the platform reset signal; and
   generate a latched rising edge signal based at least in part on the camera power signal and the platform reset signal.

5. The computing device of claim 4, wherein the LED control circuit further includes an AND gate configured to:

receive the latched rising edge signal;

receive a time delay counter output signal from the time delay counter; and control power provided to the privacy LED based at least on the camera power signal and the time delay counter output signal.

6. The computing device of claim 3, wherein:

a power supply is configured to provide power to the computing device via a self-secured system signal transmitted over a main power rail; and the LED control circuit is further configured to:

detect that the power supplied to the computing device via the self-secured system signal is below a platform power threshold, as indicated by the platform reset signal; and in response to detecting that the power supplied to the computing device is below the platform power threshold, reset the time delay counter.

7. The computing device of claim 3, wherein the camera, the privacy LED, and the LED control circuit are included in an offboard camera device that is configured to receive the camera activation signal from an offboard computing device in which the processor is located.

8. The computing device of claim 2, wherein:

the LED control circuit includes a plurality of lookup table integrated circuits;

the lookup table integrated circuits store a respective plurality of delay parameters; and the LED control circuit is configured to set the time delay counter to have the predefined time delay at least in part by applying a delay parameter of the plurality of delay parameters to the time delay counter.

9. The computing device of claim 1, wherein:

the computing device further includes a display device;

the camera is a front-facing camera that faces in a same direction as the display device; and the privacy LED is a front-facing privacy LED that faces in the same direction as the display device.

10. The computing device of claim 9, wherein:

the front-facing camera is a red-green-blue (RGB) camera;

the computing device further includes an infrared camera (IR) that faces in the same direction as the display device; and the IR camera is coupled to the shared power rail.

11. The computing device of claim 1, wherein the LED control circuit is configured to power the privacy LED without receiving a privacy LED control general-purpose input/output (GPIO) signal.

12. The computing device of claim 1, wherein the LED control circuit is further configured to:

receive a camera control general-purpose input/output (GPIO) signal;

determine that the camera control GPIO signal differs from the hardware-level signal; and output a mismatch notification in response to determining that the camera control GPIO signal differs from the hardware-level signal.

13. A method for use with a computing device, the method comprising:

at an LED control circuit included in the computing device:

powering a camera and a privacy LED via a shared power rail such that the privacy LED is illuminated in conjunction with powering of the camera; and controlling power provided to the privacy LED via the shared power rail using a hardware-level signal generated based at least in part on:

a camera power signal provided to the camera; and a platform reset signal of the computing device, wherein the platform reset signal indicates a device boot that occurs at the computing device.

14. The method of claim 13, further comprising, at the LED control circuit:

during a boot sequence of the computing device, detecting a rising edge of the camera power signal; and in response to detecting the rising edge, commencing inhibiting the powering of the privacy LED until a predefined time delay has elapsed, as indicated by a time delay counter.

15. The method of claim 14, further comprising, at the LED control circuit:

subsequently to the predefined time delay elapsing, receiving a camera activation signal from a processor included in the computing device; and in response to receiving the camera activation signal, powering the camera and the privacy LED via the shared power rail.

16. The method of claim 15, further comprising:

at a power supply, providing power to the computing device via a self-secured system signal transmitted over a main power rail; and at the LED control circuit:

detecting that the power supplied to the computing device via the self-secured system signal is below a platform power threshold, as indicated by the platform reset signal; and in response to detecting that the power supplied to the computing device is below the platform power threshold, resetting the time delay counter.

17. The method of claim 13, wherein:

the computing device further includes a display device;

the camera is a front-facing camera that faces in a same direction as the display device; and the privacy LED is a front-facing privacy LED that faces in the same direction as the display device.

18. The method of claim 13, wherein:

the front-facing camera is a red-green-blue (RGB) camera;

the computing device further includes an infrared camera (IR) that faces in the same direction as the display device; and the IR camera is coupled to the shared power rail.

19. The method of claim 13, further comprising, at the LED control circuit:

receiving a camera control general-purpose input/output (GPIO) signal;

determining that the camera control GPIO signal differs from the hardware-level signal; and outputting a mismatch notification in response to determining that the camera control GPIO signal differs from the hardware-level signal.

20. A computing device comprising:

a camera;

a privacy light-emitting diode (LED) configured to be illuminated in conjunction with powering of the camera;

a processor; and an LED control circuit configured to:

during a boot sequence of the computing device, inhibit powering of the privacy LED until a predefined time delay has elapsed;

subsequently to the predefined time delay elapsing, receive a camera activation signal from the processor; and in response to receiving the camera activation signal, power the camera and the privacy LED via a shared power rail such that the privacy LED is illuminated.

*  *  *  *  *